Figure 1:
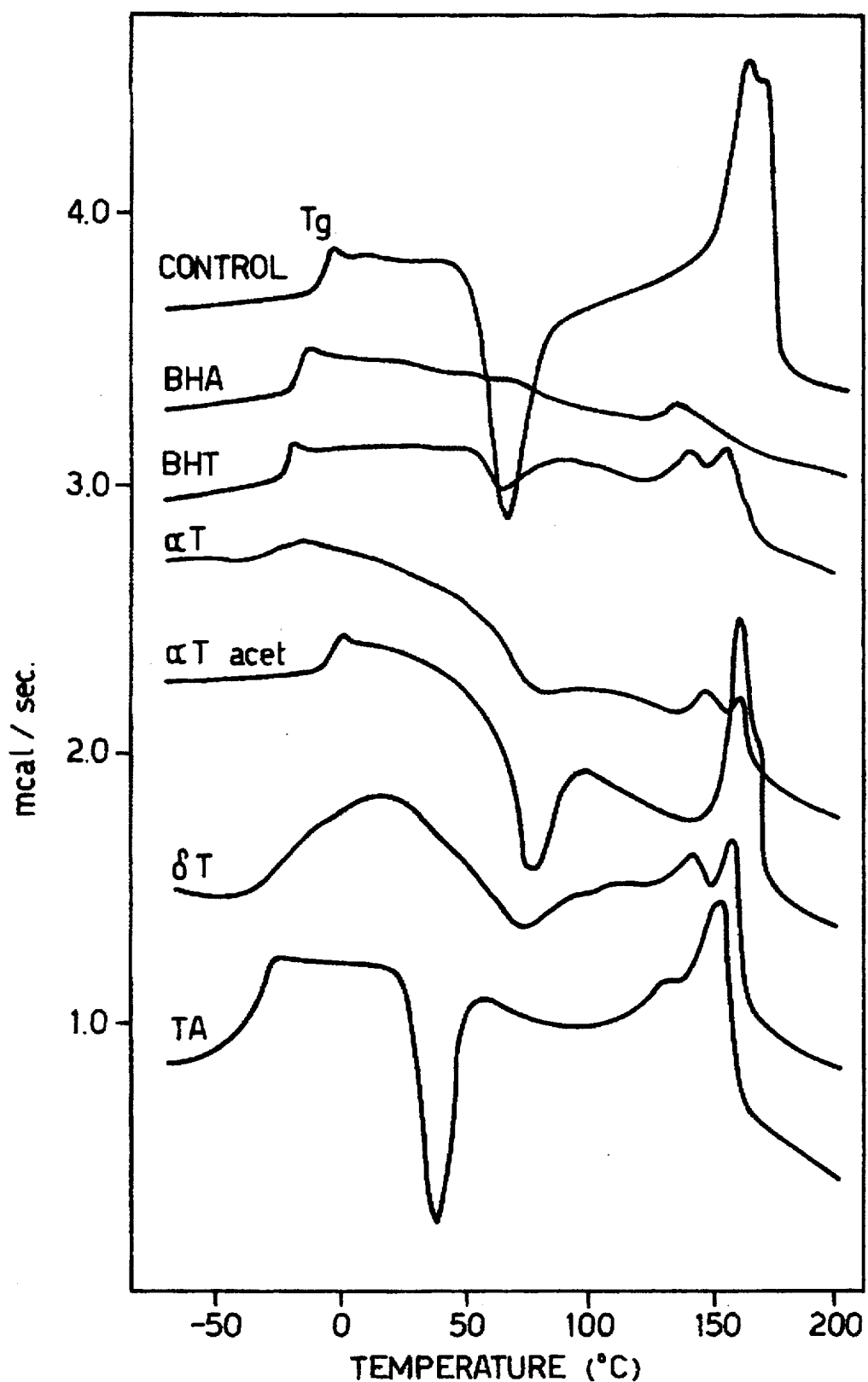

United States Patent [19]

Hammond et al.

[11] Patent Number: 5,760,170

[45] Date of Patent: Jun. 2, 1998

[54] POLYESTER COMPOSITION

[75] Inventors: Timothy Hammond, Sedgefield, United Kingdom; John Michael Vivian Blanshard, Loughborough, England; Shuzo Fujita, Tsu, Japan

[73] Assignee: Monsanto Company, St. Louis, Mo.

[21] Appl. No.: 809,316

[22] PCT Filed: Sep. 8, 1995

[86] PCT No.: PCT/GB95/02150

§ 371 Date: Jun. 16, 1997

§ 102(e) Date: Jun. 16, 1997

[87] PCT Pub. No.: WO96/07697

PCT Pub. Date: Mar. 14, 1996

[30] Foreign Application Priority Data

Sep. 9, 1994 [GB] United Kingdom ............... 9418174

[51] Int. Cl.$^6$ ........................................... C08G 63/06
[52] U.S. Cl. ..................... 528/361; 528/176; 528/212; 528/361; 525/450; 524/714
[58] Field of Search ................... 528/176, 212, 528/361; 525/450; 524/714

[56] References Cited

FOREIGN PATENT DOCUMENTS 0 587 069  3/1994  European Pat. Off. .

OTHER PUBLICATIONS

Database WPI, Section Ch, Week 9441, Derwent Publications Ltd., London, GB; Class A23, AN 94–329584 & JA, A, 06 255 039, Sep. 13, 1994.

*Primary Examiner*—Samuel A. Acquah
*Attorney, Agent, or Firm*—Gary L. Bond; Arnold, White & Durkee

[57] ABSTRACT

A polymer composition comprises (a) a stereospecific, preferably fermentation derived, polyester of molecular weight Mw over 100000 consisting of repeating units of formula —O—$C_mH_n$—CO— in which n=2m and units with m=3 and m=4 with respectively a $C_1$ and $C_2$ side group on the carbon atom next to oxygen in the polymer chain are copolymerised together, m being 3 in 70–95 mol percent of such units; and (b) at least one alkyl phenol in which the alkyl group preferably contains at least one tertiary carbon atom adjacent to or within 4 carbon atoms of the phenol nucleus. The alkyl phenol may be hindered and may contain a $C_{1-6}$ alkoxy group para to the phenolic hydroxy group. Suitable alkyl phenols include 2-tert-butyl-4-hydroxyanisole and alpha- or delta- tocopherol and others usable as antioxidants in foods, oils and polymer systems. The polyester and alkyl phenol and relative proportions thereof are preferably chosen to provide inhibition of crystallisation of the polyester corresponding to an Avrami 'k' parameter less than 0.03.

14 Claims, 3 Drawing Sheets

POLYESTER COMPOSITION

POLYESTER COMPOSITION

THIS INVENTION relates to a polyester composition and in particular to a composition comprising an aliphatic polyester and a plasticiser.

Examples of such polyesters have become available commercially as the result of developing microbiological processes for making them. The earliest example, PHB, was difficult to melt-process owing to low thermal stability at its melting temperature. Corresponding copolymers melt at a lower temperature. When such polyester is used for making plastics shaped articles, it may be necessary to formulate it with a plasticiser in order to obtain desired mechanical properties. Many plasticising compounds have been proposed for this duty, but there is room for improvement in the mechanical properties obtained and their permanence.

It has now been found that compositions comprising such polyesters (which term is herein to include homopolyesters, copolyesters and mixtures thereof) and one or more phenolic compounds of a defined class show substantial advantages.

ACCORDING TO THE INVENTION in its first aspect a polymer composition comprises (a) a stereospecific polyester of molecular weight Mw over 100000 consisting of repeating units of formula —O—$C_mH_n$—CO— in which n=2m and units with m=3 and m=4 with respectively a $C_1$ and $C_2$ side group on the carbon atom next to oxygen in the polymer chain are copolymerised together, m being 3 in 70–95 mol percent of such units; and (b) at least one alkyl phenol.

In the alkyl phenol there is preferably at least one alkyl group containing a chain of at least 2 and suitably up to 20 carbon atoms. Preferably at least one such alkyl group contains at least one tertiary carbon atom, for example linked to 2 side substituents other than hydrogen, at least one of which atoms is carbon. The chain preferably carries at least 2 and suitably up to 6 hydrocarbon side substituents, and these are preferably $C_{1-6}$, especially methyl. A or the tertiary carbon atom is preferably adjacent to or within 4 carbon atoms of the phenol nucleus. On any of the tertiary carbon atoms, any side substituent atom that is not carbon is preferably oxygen.

The alkyl phenol is preferably "hindered", that is, rotation of the alkyl group is inhibited by collision with a nuclear substituent (especially OH or O-alkyl) ortho to the alkyl group or is prevented by a ring-forming linkage of the alkyl group to the phenolic nucleus.

The alkyl phenol preferably contains also at least one hydrocarbonoxy group, preferably para to the phenolic OH group. Suitably the hydrocarbonoxy group is $C_{1-6}$ alkoxy.

Particular examples of suitable alkyl phenols are:
2-tert-butyl-4-hydroxyanisole) mixture 'BHA'
3-tert-butyl-4-hydroxyanisole)
3,5-di-tert-butyl-4-hydroxytoluene 'BHT'
α-tocopherol 'α-T'
δ-tocopherol 'δ-T'.

Instead of the free alkyl phenol, an ester thereof may be present, for example a $C_{1-6}$ carboxylic ester. It is believed that such ester is an example of a precursor decomposable to the alkyl phenol during processing and/or ageing of the polyester. Likewise, a thermal and/or oxidative reaction product of the alkyl phenol, such as may result from processing and/or ageing, may be added instead of free alkyl phenol. A particular example is 2,2'-dihydroxy-5,5'-dimethoxy-3,3'-di-tert-butylbiphenyl, an oxidation product of 3-tert-butyl-4-hydroxyanisole.

The defined class of alkyl phenols includes compounds effective as anti-oxidants, for example in foods, oils and polymer systems. These may be used and are believed to be preferable, especially if they are harmless to life and/or are biodegradable.

The invention includes:
(a) the composition as freshly prepared;
(b) the composition after processing steps short of conversion to finished article;
(c) finished article: in which there is present the defined alkyl phenol and/or whatever conversion product has been formed from it.

The polyester is preferably capable of a relatively high level of crystallinity, eg over 30%, especially 50–90%, in the absence of additives.

The molecular weight Mw of the PHA is for example up to eg $2 \times 10^6$.

In PHAs having m=3 and m=4 there may be very small, typically fractional, percentages of units having higher values of m. PHA consisting essentially of m=3 units is poly-3-R-hydroxybutyrate (PHB), and PHA consisting of m=3 and 4 units is polyhydroxybutyrate-co-valerate (PHBV).

The PHA can be a product of fermentation, especially a process in which a microorganism lays down PHA during normal growth or is caused to do so by starvation of one or more cell nutrients necessary for cell multiplication. The microorganism may be wild or mutated or may have the necessary genetic material introduced into it. Alternatively the necessary genetic material may be harboured by an eukariote. PHA so made is R-stereospecific. Examples of suitable microbiological processes are disclosed in EP-A-69497 (*Alcaligenes eutrophus*).

The PHA can be extracted from the fermentation product cells by decomposing non-PHA cellular material leaving microscopic granules of PHA, or by means of an organic solvent applied to the fermentation product or to such product after one or more steps such as cell breakage or part-decomposition of cellular material. For specialised end-uses cellular material may be partly or wholly allowed to remain with the PHA, but preferably subjected to cell breakage.

Alternatively the PHA can be synthetic, produced for example as described by Bloembergen et al. in Macromolecules 1989, 33, 1656–1663 (PHB) and 1663–1669 (PHBV).

The polyester component of the composition may contain more than one polyester, for example:
(a) polyesters having the same repeating units but differing in molecular weight; part of the polyester component may be of too low a molecular weight to be usable alone as structural material;
(b) polyesters having different combinations of repeating units;
(c) polyesters of a different class—e.g. synthetic with microbiological—but mutually miscible;
(d) polyester of a different class but not mutually miscible;
(e) polyester, whether or not differing as (a) to (d), having a different history, for example a different manufacturer or extraction procedure or different previous processing such as re-work or recycle or end-group modification.

The alkyl phenol is present in a plasticising proportion, that is, a proportion sufficient in itself to provide, or with other plasticiser(s) to enhance, a plasticising effect. The proportion of alkyl phenol to polyester depends on the intended use of the composition. The range 2–40 phr w/w includes more of the likely uses. For making effectively rigid but not brittle articles the range 5–20, especially 6–12, phr w/w is generally suitable.

The polyester, alkyl phenol and relative proportions thereof are preferably chosen to provide at least 30, especially at least 50, percent inhibition of crystallisation of the polyester. Such a composition preferably has an Avrami 'k' parameter less than 0.03, especially less than 0.01. Further, its DSC crystallisation peak preferably has an area less than 20, especially less than 5, percent of that of the same polyester free of plasticiser.

Such preferred compositions exemplify a new polyester composition defined in terms only of those parameters, and constituting a second aspect of the invention.

The composition may contain components in common use in plastics processing, for example:

(a) one or more other plasticisers other than the defined alkyl phenol;

(b) one or more stabilisers against thermal or oxidative decomposition;

(c) inorganic filler, for example glass fibre, carbon fibre platy or foil particle, silica, clay, magnesium silicate;

(d) organic filler, for example, cellulose fibre or particulate, protein fibre, synthetic polymer particle or fibre, wood flour;

(e) polymer other than polyester;

(f) pigment;

(g) nucleant, especially boron nitride, talc, ammonium chloride or DZB/Zn stearate, at preferably 0.2 to 2.0 phr;

(h) volatile solvent for the polyester and alkyl phenol.

If such other plasticiser is present, it may be selected from those already known for these polyesters and/or from any found to plasticise them subsequent to this invention. Examples are:

(a) high boiling esters of polybasic acids, such as phthalates, isophthalates, citrates, fumarates, glutarate, phosphates or phosphites. The esterified radicals may be for example $C_1$–$C_{12}$ alkyl, aryl or aralkyl. Particular examples are dioctyl-, diheptyl- and diundecyl- phthalates and dialkylalkylene oxide glutarate (Plasthall 7050);

(b) high boiling esters and part-esters of polyhydric alcohols, especially glycols, polyglycols and glycerol. Examples are triacetin, diacetin and glyceryl dibenzoate;

(c) aromatic sulphonamides such as paratoluenesulphonamide.

A particularly preferred plasticiser is a doubly esterified hydroxycarboxylic acid having at least 3 ester groups in its molecule. 'Doubly esterified' means that at least some of the hydroxy groups of the hydroxy-carboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups. An example of such a plasticiser is Estaflex* (acetyltri-n-butyl citrate). *Trade mark of AKZO.

According to a further aspect of the invention a method of making the composition comprises blending the polyester with the alkyl phenol. This may be effected by for example:

(i) mixing the alkyl phenol with the polyester in particulate form, for example in particles smaller than 1000, especially smaller than 100, microns. Preferably the particles are in the size range 0.1 to 50 microns. The particles are especially those obtained by enzymatic removal of non-polyester cell material such as protein from a microbiologically produced biomass. The alkyl phenol can be introduced at any convenient stage, including stages before the particles are isolated from the aqueous medium.

(ii) melting a mixture of polyester with alkyl phenol. The mixture is preferably as made by method (i). Other components, for example as in (a) to (d) above, especially those that assist melting, may be present;

(iii) bringing the polyester and alkyl phenol together in a volatile solvent for the polyester. The solvent may have been introduced as a means of extracting the polyester from a microbiologically produced biomass or an intermediate product from which microbiological cell material has been partly removed. Solvent can then be removed or not, according to the requirements of further processing. Suitable solvents include cyclic carbonate esters and halogenated hydrocarbons such as dichloromethane, chloroform and 1,2-dichloroethane. A particular process comprises:

(i) forming a biomass of cells containing PHA granules and non-PHA cell material by fermentation;

(ii) treating the biomass to solubilise non-PHA cell material;

(iii) separating the PHA granules from the liquid phase; and is characterised by introducing at least one alkyl phenol as hereinbefore defined.

The process may include treating the granules with a peroxide whereby to solubilise non-PHA cell material additional to what has been solubilised in step (ii), and separating the granules from the resulting liquid phase.

In a yet further aspect the invention provides a process of making a shaped article by confining, eg in a mould or on a surface or through a die, a composition as defined above.

Particular methods include injection moulding, compression moulding, extrusion of fibre or film, extrusion of profile, gas-current spinning, tack spinning, coating on to substrate, any of these being carried out, as appropriate, using the composition in the form of melt, particulate or solution in volatile solvent. Examples of shaped articles made by such methods include films especially for packaging, coated products (such as paper, paperboard and non-woven fabrics), fibres, non-woven fabrics, extruded nets, personal hygiene products, bottles and drinking vessels, agricultural and horticultural films and vessels, slow-release devices and ostomy bags. Alternatively the composition can be used as an adhesive.

Figure 2:
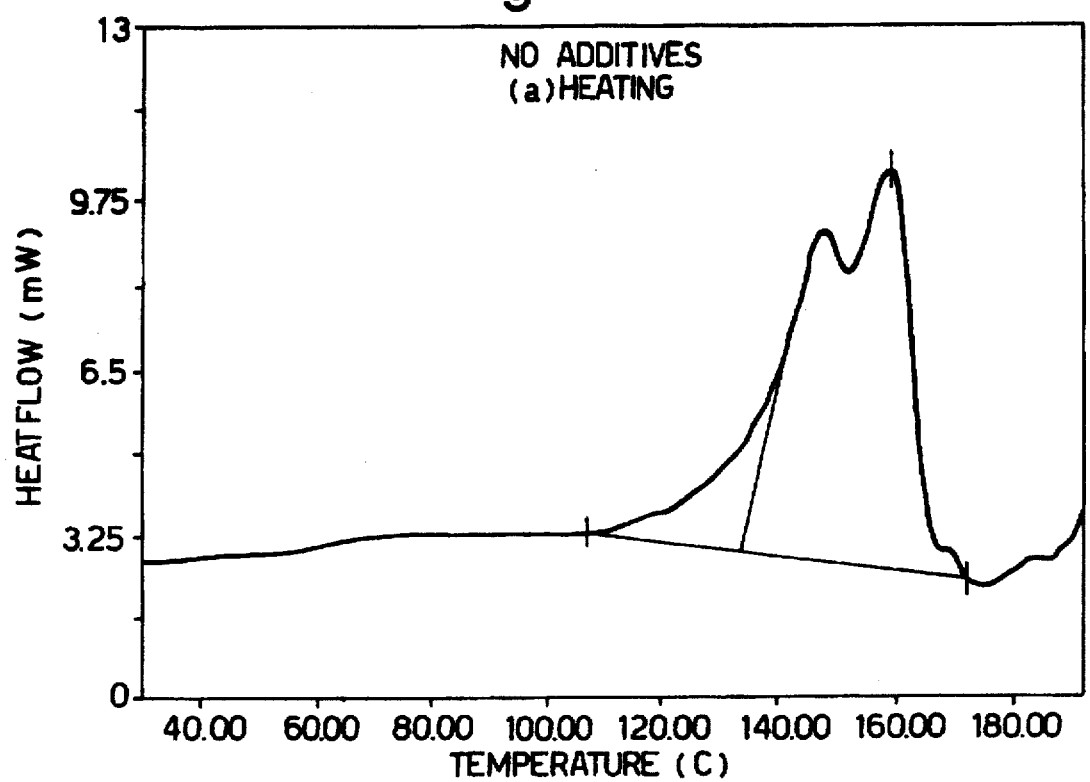
Figure 2:
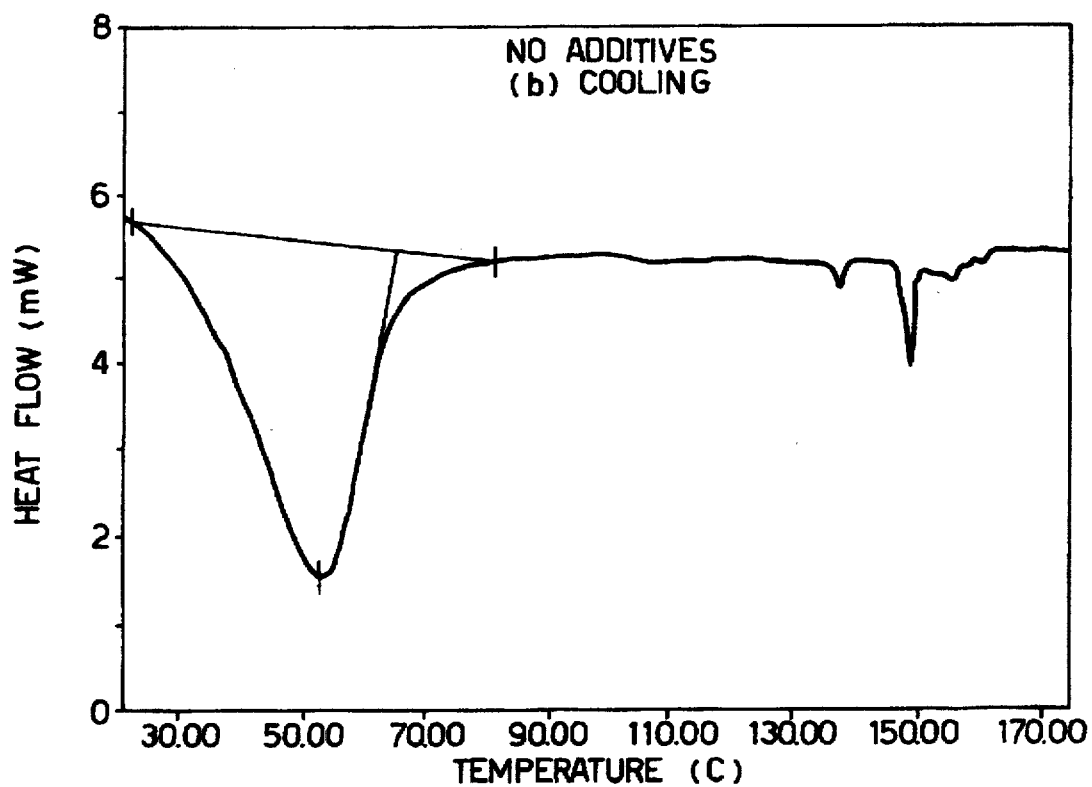
Figure 2:
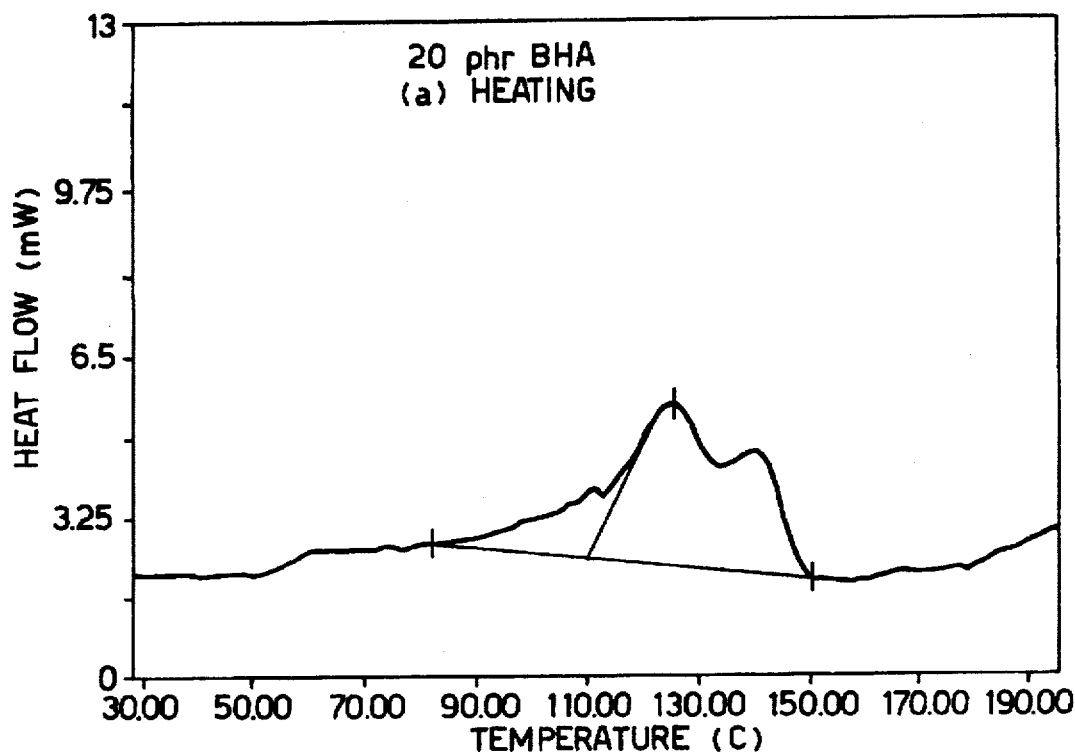
Figure 2:
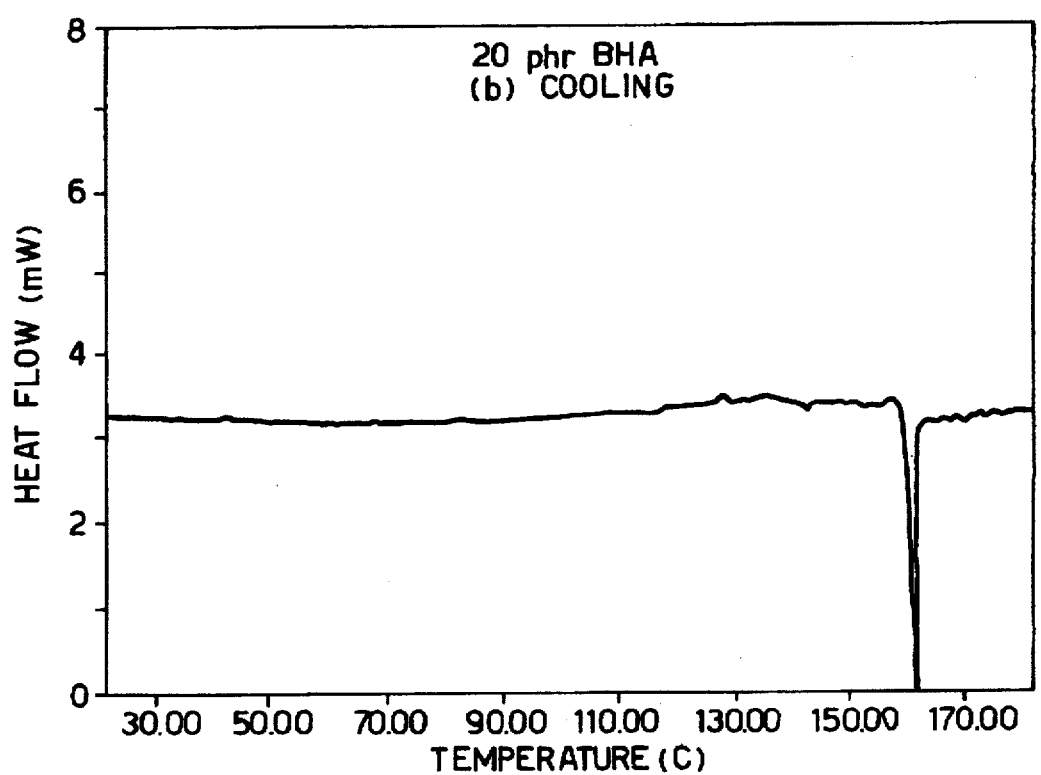

The drawings accompanying this specification are as follows:

FIG. 1 : a family of DSC heating curves for control, reference and invention compositions;

FIG. 2 : DSC heating curves (a) and cooling curves (b) for pure polyester and composition containing 20phr of BHA.

The following further data relate to the curves shown in FIG. 2.

| No Additives | | | | |
|---|---|---|---|---|
| (a) Heating | Peak from : | 108.73° C. | Peak | 159.48° C. |
| | to : | 172.00 | | |
| | Onset | 133.72 | | |
| | J/g | 65.14 | | |
| (b) Cooling | Peak from : | 23.23° C. | Peak | 52.97° C. |
| | to : | 82.15 | | |
| | Onset | 66.36 | | |
| | J/g | 31.04 | | |
| 20 ph v BHA | | | | |
| (a) Heating | Peak from : | 82.10° C. | Peak | 126.46° C. |
| | to : | 150.71 | | |
| | Onset : | 110.17 | | |
| | J/g : | 35.93 | | |
| (b) Cooling | (No further data) | | | |

The invention is illustrated by the following experimental data by way of example. TEST PROCEDURES : SERIES A PROPERTIES OF FRESH COMPOSITION Differential scanning Calorimetry (DSC) Specimen Preparation Polyester and plasticiser (if used) (together totalling 1.0 g) were dissolved in chloroform (60 ml), warmed at 50° C. for 10 min, then cast in a stainless steel tray (inside diameter 76.2 mm) and dried under vacuum. The resulting film was 0.2 to 0.28 mm thick. A specimen (ca 4 mg) was cut from the film, placed in each aluminium pan of the DSC instrument and sealed.

DSC Examination

This technique measures the energy flow towards or from a specimen in comparison with an inert reference as a function of time and temperature. A DSC instrument typically includes two isolated insulated holders on each of which a pan containing respectively the test specimen or the reference is mounted. The heat flow is measured and compensated for, to maintain the temperature with respect to the reference. The instrument can be operated in dynamic mode under a preset temperature program or in isothermal mode.

(i) A Perkin Elmer DSC-2 instrument equipped with a Thermal Analysis Data Station was used in dynamic mode:

Run 1: heat at 20° C. min$^{-1}$ from 20° C. to 200° C.; hold at 200° C. for 1 min to ensure sample fully melted; cool at minus 200° C. min$^{-1}$ to minus 80° C.; hold at minus 80° C. for 10 min to preserve amorphous state.

Run 2: Finally heat at 20° C. min$^{-1}$ from minus 80° to 200° C.

From the measured heat flows the following parameters were derived:

$T_g$ glass transition temperature (run 2);
$T_p(1)$ and $T_p(2)$ peak temperature of melting for the 2 peaks seen;
$\Delta H$ melting enthalpy.

(ii) The DSC-2 instrument was operated in isothermal mode as follows:
heat at 20° C. min$^{-1}$ from 20° C. to 200° C.;
hold for 10 min at 200° C. to melt;
cool to 57° C. rapidly;
hold at 57° C., recording crystallisation peak(s).

The results were analysed by computer loaded with a DSC-2C/4 isothermal program, and then further in terms of the Avrami equation $$\theta = \exp(-kt^n)$$

where $\theta$ is the fraction of uncrystallised material remaining after time t;

k is a rate constant; and
n is the Avrami exponent, which is usually considered to be characteristic of the mode of nucleation.

Tensile Test

Following Japanese Industry Standard K6301, film 0.2 mm thick as made for DSC (see above) was cut into No 3 dumbbell pieces of central dimensions 5×20×0.2 mm. These were tested at 0.2 mm sec$^{-1}$ on a TA-XT2 machine from Stable Micro Systems, Haslemere, UK.

EXAMPLES

Polyester compositions were prepared from a PHB of this specification:
structure: PHBV 90:10 copolymer (formula 1, m=3.1 average);
molecular weight $M_w$ 477000;
origin: fermentation of glucose+propionic acid by *Alcaligenes eutrophus*;
extraction: enzymatic cell-debris removal.

The compositions tested were as follows:
Control—no additive
Reference—known plasticiser triacetin TA
Invention—BHA
Invention—BHT
Invention—α-T
Invention—δ-T Each additive was used at 10, 20 and 30% w/w, i.e. 11.11, 25 and 42.86 phr.

Results were as follows:

DSC second run dynamic mode results are set out in Table 1. (Note: the $\Delta H$ values have been recalculated to give energies relative to the amount of polymer present: the 30% compositions for example contain only 70% of polymer).

TABLE 1

| Additive | | $T_g$ | $T_p 2$ | $T_p 2$ | $\Delta H$ (cal/g polyester) |
|---|---|---|---|---|---|
| None | | −14.3 | 152.5 | 161.0 | 15.1 |
| 10% : | BHA | −18.6 | 142.2 | 152.9 | 11.88 |
| | BHT | −18.1 | 144.8 | 155.3 | 13.64 |
| | α-T | −15.2 | 152.7 | 158.1 | 15.4 |
| | δ-T | −17.5 | 146.6 | 155.1 | 14.3 |
| | (TA | −23.1 | 143.1 | 157.7 | 15.07) |
| 20% : | BHA | −26.3 | 130.7 | 138.7 | 6.84 |
| | BHT | −28.1 | 134.6 | 147.5 | 12.00 |
| | α-T | −23.6 | 142.1 | 153.4 | 12.48 |
| | δ-T | −25.8 | 137.9 | 151.1 | 12.48 |
| | (TA | −40.2 | 126.2 | 146.2 | 12.84) |
| 30% : | BHA | −29.9 | 125.0 | 0.0 | 1.56 |
| | BHT | −33.3 | 129.3 | 143.3 | 13.39 |
| | α-T | −36.3 | 138.6 | 151.3 | 13.39 |
| | δ-T | −41.2 | 135.2 | 149.8 | 13.52 |
| | (TA | −47.9 | 118.5 | 140.4 | 15.21 |

The following effects are observable:

$T_g$: each invention additive lowers $T_g$, but less strongly than triacetin. The tocopherols appear to give a stronger effect per unit weight of phenolic OH.

$T_p$: similarly a decrease in melting temperature was seen. This is again characteristic of plasticised systems.

$\Delta H$: the melting enthalpy is indicative of the level of crystallinity achieved by the polymer during the DSC. The compositions containing BHA consistently give lower $\Delta H$ values suggesting that crystallisation was being inhibited.

The DSC second run results for compositions containing 30% additive are shown also in FIG. 1. It is evident that a strong crystallisation exotherm occurs in the unplasticised polyester and in the triacetin composition.

However, this exotherm is weak in the composition containing αT acetate, very weak in the compositions containing BHT and δT, and substantially absent in those containing BHA and αT. It is concluded that plasticisation in the invention compositions is by a mechanism distinct from that effective in the triacetin composition.

This is borne out by the Avrami parameters: the following were calculated:

|  | n | k |
|---|---|---|
| control | 2.3 | 0.368 |
| (triacetin 20% | 2.2 | 0.055) |
| BHA 20% | 1.8 | 0.001 |
| α-T 20% | 2.0 | 0.004 |

The k values imply that the rate of recrystallisation of PHBV has been decreased drastically, but the n values show that the mechanism of recrystallisation is unchanged.

DSC heating (a) and cooling (b) curves for unplasticised polyester and composition containing 20 phr BHA are shown in FIG. 2. From the heating curves it is evident that the area under the melting peak is halved by the plasticiser. The cooling curves shown a strong exotherm for unplasticised polyester, but no sign of crystallisation in the composition.

Tensile Test

The effect on elongation-to-break (ETB) is shown in Table 2:

TABLE 2

| Additive | % w/w | ETB % |
|---|---|---|
| None | 0 | 15.9 |
| (TA | 10 | 23.0 |
|  | 20 | 28.0 |
|  | 30 | 47.0) |
| BHA | 10 | 31.0 |
|  | 20 | 40.0 |
|  | 30 | 56.0 |
| α-T | 10 | 25.0 |
|  | 20 | 55 |
|  | 30 | 80.0 |

TEST PROCEDURES : SERIES B CHANGE OF PROPERTIES WITH TIME

The following properties were determined by standard procedures at 90 days after preparation of the compositions:

Young's modulus (YM) MPa
Stress at break (SAB) MPa
Displacement at break (DAB) %
IZOD impact strength (IZOD) $Jm^{-1}$.

The composition tested consisted of:
PHBV copolymer having a B:V molar ratio 93:7 but otherwise similar to the polymer used in the series A tests;
20phr w.w plasticiser (if used);
1 phr w/w boron nitride nucleant.

The plasticisers used were:
none (control);
Acetyl-tri-n-butyl-citrate (ATBC) (control) BHA
BHA+ATBC 10 phr w/w each α-T Results are shown in Table 3.

TABLE 3

|  | Plasticiser | | | | |
|---|---|---|---|---|---|
|  | None | ATBC | BHA | BHA.ATBC | α-T |
| YM | 1010.0 | 356.3 | 280.6 | 391.1 | 522.4 |
| SAB | 24.4 | 15.0 | 14.7 | 16.0 | 17.2 |
| DAB | 12.3 | 25.9 | 28.8 | 25.5 | 25.5 |
| IZOD | 69.0 | 224.8 | 265.8 | 223.8 | 125.8 |

The following conclusions can be drawn:

From YM: the plasticised compositions are distinctly less stiff than the unplasticised composition; since the BHA/ATBC mixture is less effective than an equal proportion of either plasticiser used alone, it appears that these act by different mechanisms;

α-T is less effective than BHA, but this may be due to its higher molecular weight per phenolic OH (α-T 430, BHA 180).

From SAB and DAB: the invention plasticisers are at least equal to the known ATBC;

From IZOD: BHA and BHA/ATBC are approximately equal but inferior to BHA alone. The lower impact strength using α-T may correlate with its higher molecular weight per phenolic OH.

We claim:
1. Polymer composition comprising:
   (a) a stereospecific polyester of molecular weight Mw over 100000 consisting of repeating units of formula —O—$C_mH_n$—CO— in which n=2m and units with m=3 and m=4 with respectively a $c_1$ and $C_2$ side group on the carbon atom next to oxygen in the polymer chain are copolymerised together, m being 3 in 70–95 mol percent of such units; and
   (b) at least one alkyl phenol.

2. Composition according to claim 1 in which the alkyl phenol comprises at least one alkyl group containing a chain of 2–10 carbon atoms and at least one such alkyl group contains at least one tertiary carbon atom.

3. Composition according to claim 2 in which the tertiary carbon atom is linked to 2 side substituent atoms other than hydrogen, at least one of which atoms is carbon and in which any side substituent that is not carbon is oxygen.

4. Composition according to claim 2 in which the chain of the alkyl group carries 2–6 $C_{1-6}$ alkyl groups as side substituents.

5. Composition according to claim 4 in which the side substituents are methyl.

6. Composition according to claim 2 in which a tertiary carbon atom is adjacent to or within 4 carbon atoms of the phenol nucleus.

7. Composition according to claim 2 in which the alkyl phenol is hindered.

8. Composition according to claim 7 in which the alkyl phenol also contains a $C_{1-6}$ alkoxy group para to the phenolic hydroxy group.

9. Composition according to claim 1 in which the alkyl phenol is selected from:
   a 2-tert-butyl-4-hydroxyanisole
   b 3-tert-butyl-4-hydroxyanisole
   c mixture of a and b
   d 3,5-di-tert-butyl-4-hydroxytoluene
   e alpha-tocopherol
   f delta-tocopherol g 2,2'-dihydroxy-5-5'-dimethoxy-3,3'-di-tert-butylbiphenol.

10. Composition according to claim 1 in which the alkyl phenol is chosen from those usable as antioxidants in foods, oils and polymer systems.

11. Composition according to claim 1 in which the polyester has been extracted from fermentation product cells by decomposing non-PHA cellular material leaving microscopic granules of polyester.

12. Composition according to claim 1 in which the proportion of alkyl phenol to polyester is in the range 5–20 phr by weight.

13. Composition according to claim 1 in which the polyester and alkyl phenol and relative proportions thereof are chosen to provide at least 30, percent inhibition of crystallisation of the polyester, corresponding to an Avrami 'k' parameter, and a DSC crystallisation peak of area less than 20, percent of that of the same polyester free of plasticiser.

14. Composition according to any claim 1 containing also as further plasticiser a doubly esterified hydroxycarboxylic acid having at least 3 ester groups in the molecule.

* * * * *

UNITED STATES PATENT AND TRADEMARK OFFICE
CERTIFICATE OF CORRECTION

PATENT NO. : 5,760,170
DATED : JUNE 2, 1998
INVENTOR(S) : Timothy Hammond/John Michael Vivian Blanshard/Shuzo Fujita It is certified that error appears in the above-identified patent and that said Letters Patent is hereby corrected as shown below:

In claim 1, line 33, "$c_1$" should read --$C_1$--.

In claim 13, line 5, after "parameter", insert --less than 0.03--.

In claim 13, line 6, after "20", delete --,--.

In claim 14, line 8, before "claim 1", delete --any--.

In claim 14, line 8, after "containing", delete --also--.

Signed and Sealed this

Fifteenth Day of September, 1998

Attest:

Attesting Officer

BRUCE LEHMAN

Commissioner of Patents and Trademarks